(12) United States Patent
Costello et al.

(10) Patent No.: US 6,964,412 B2
(45) Date of Patent: Nov. 15, 2005

(54) RING SHAPED SPRING DEVICE

(75) Inventors: Philip G. Costello, North Haven, CT (US); Frank R. Hrovat, Sylvania, OH (US)

(73) Assignee: Barnes Group, Inc., Bristol, CT (US)

( * ) Notice: Subject to any disclaimer, the term of this patent is extended or adjusted under 35 U.S.C. 154(b) by 0 days.

(21) Appl. No.: 10/853,827

(22) Filed: May 26, 2004

(65) Prior Publication Data

US 2004/0212131 A1 Oct. 28, 2004

Related U.S. Application Data

(62) Division of application No. 10/259,695, filed on Sep. 30, 2002.

(51) Int. Cl.[7] ................................................. F16F 1/06
(52) U.S. Cl. ..................................................... 267/179
(58) Field of Search ........................... 267/89, 91, 167, 267/170, 179

(56) References Cited

U.S. PATENT DOCUMENTS

| | | |
|---|---|---|
| 1,146,933 A | 7/1915 | Gallagher, Jr. |
| 1,290,023 A * | 12/1918 | Clarke ........................ 152/262 |
| 1,295,316 A | 2/1919 | Hines |
| 1,390,948 A | 9/1921 | Woodward |
| 1,444,452 A | 2/1923 | Bigelow |
| 1,603,977 A | 10/1926 | Olmstead |
| 1,943,492 A | 1/1934 | Symington |
| 2,633,352 A | 3/1953 | Dath |
| 3,257,852 A | 6/1966 | Perkins |
| 3,881,713 A | 5/1975 | Joyce |
| 4,385,754 A | 5/1983 | Waite |
| 4,426,076 A | 1/1984 | Palmer |
| 4,756,071 A | 7/1988 | Takeuchi |
| 5,306,086 A | 4/1994 | Orlowski et al. |
| 5,692,599 A * | 12/1997 | Winter ........................ 200/401 |
| 5,709,371 A * | 1/1998 | Balsells ........................ 267/167 |
| 5,772,191 A | 6/1998 | Nakano et al. |
| 6,575,439 B1 | 6/2003 | Costello et al. |
| 2004/0104523 A1 * | 6/2004 | Costello et al. ............... 267/89 |
| 2004/0214475 A1 * | 10/2004 | Costello et al. ............. 439/700 |
| 2004/0217528 A1 * | 11/2004 | Costello et al. ............. 267/179 |

FOREIGN PATENT DOCUMENTS

| | | |
|---|---|---|
| DE | 7112269 | 8/1971 |
| DE | 40 18 008 A1 | 12/1991 |
| DE | 195 04 961 | 8/1996 |
| DE | 202 18 768 U 1 | 4/2002 |
| WO | WO 92/00461 | 1/1992 |

* cited by examiner

Primary Examiner—Christopher P. Schwartz
(74) Attorney, Agent, or Firm—Fay, Sharpe, Fagan, Minnich & McKee, LLP

(57) ABSTRACT

A spring device comprising at least one annular support plate defining a ring with a central axis; a plurality of circumferentially spaced, parallel oriented coil springs disposed about the at least one annular plate; and, a plurality of lock assemblies spaced about the plate. Each of the lock assemblies being in position within a spring cavity of one of the coil springs to allow additional springs to be provided on the spring device. In addition, the lock assemblies are dimensioned so that the coil spring is retained in a pre-stressed condition.

2 Claims, 11 Drawing Sheets

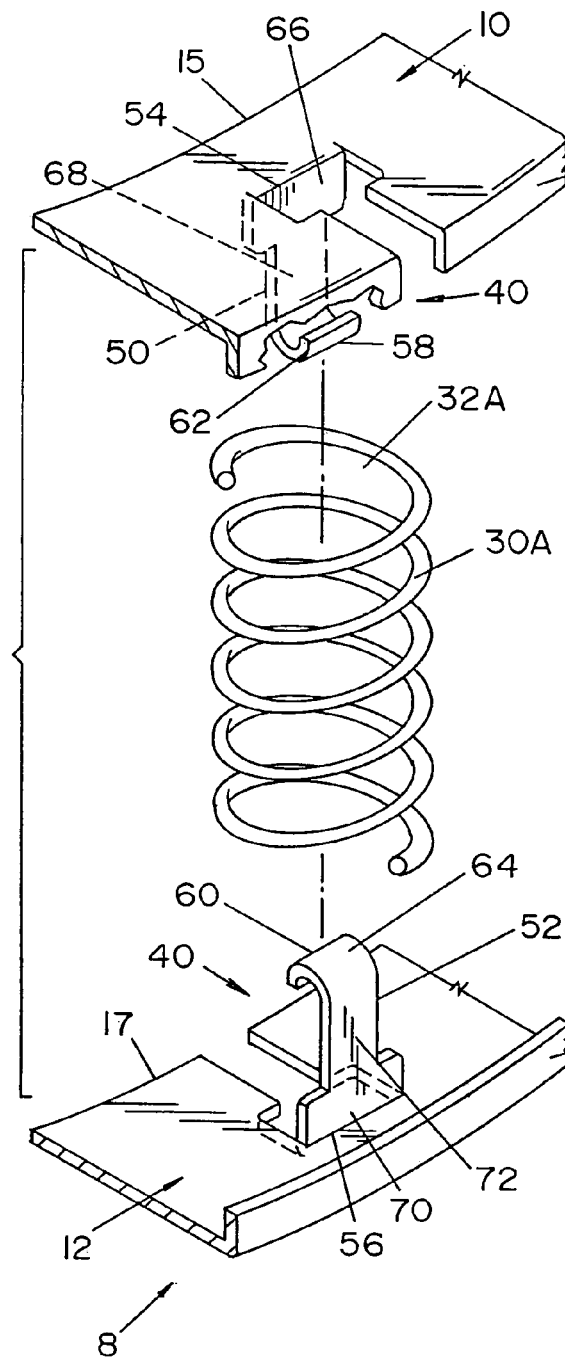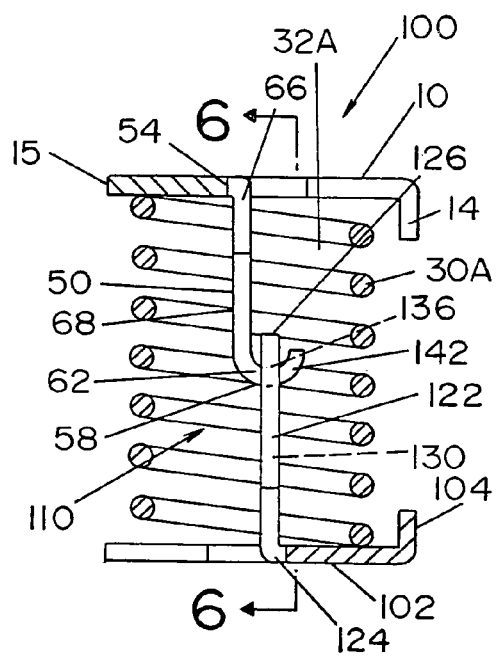
FIG. 4
FIG. 5
FIG. 6

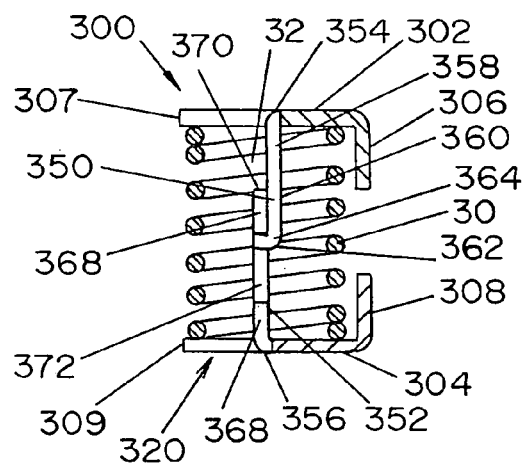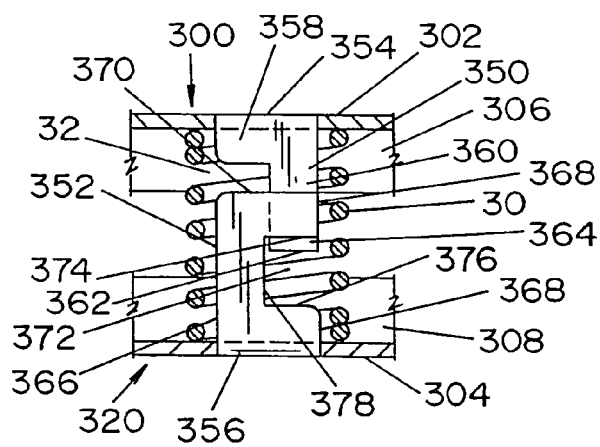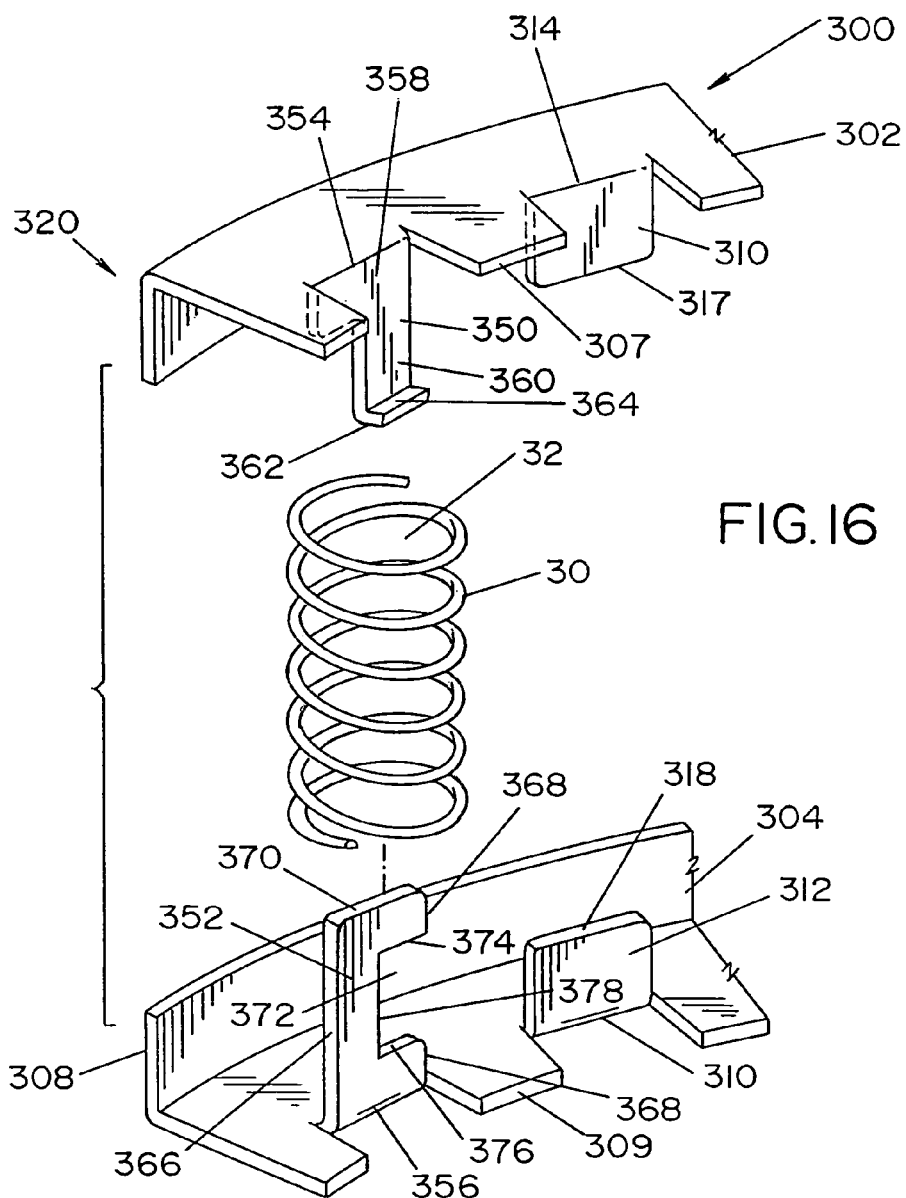

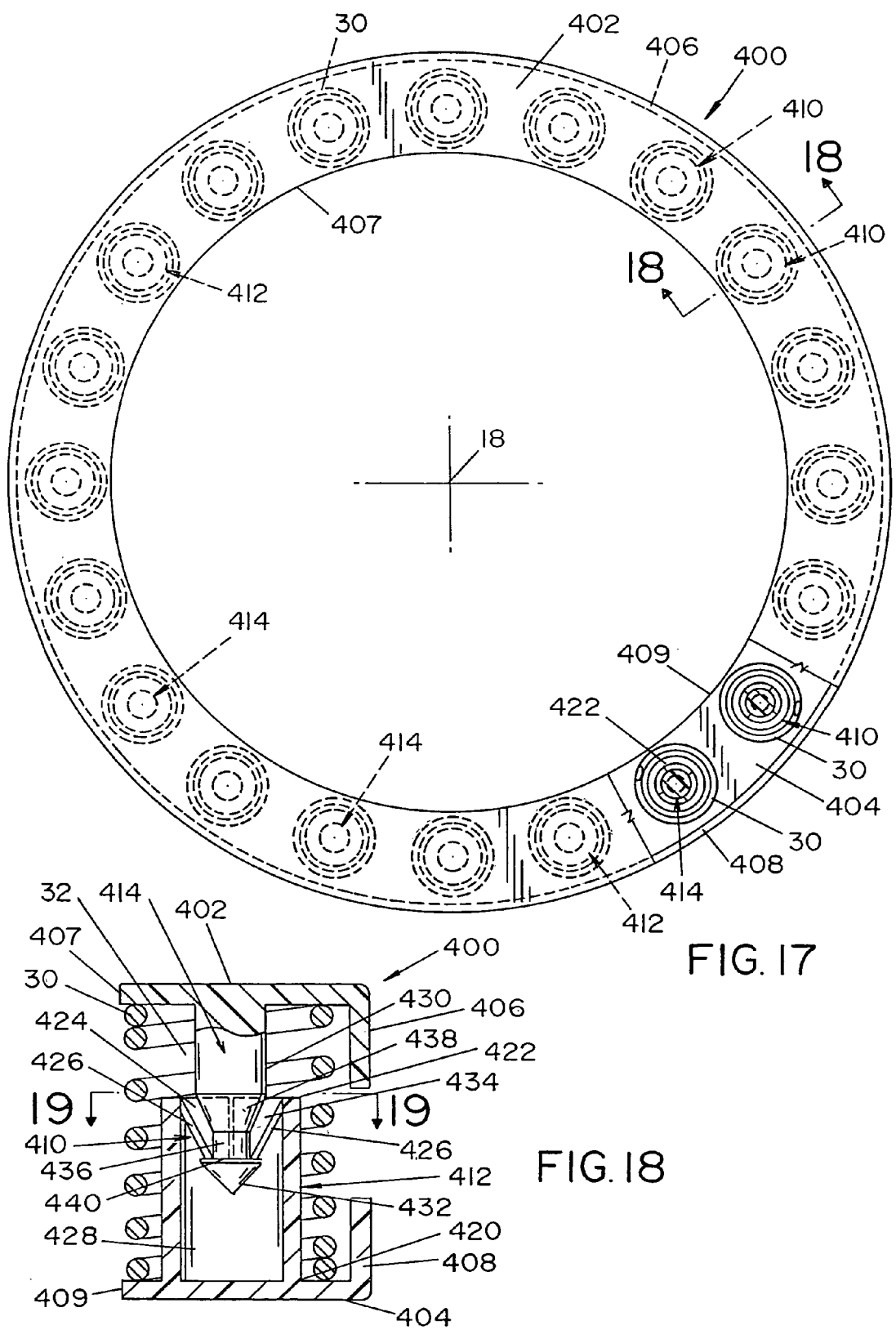

RING SHAPED SPRING DEVICE

This application claims the benefit, as a divisional application, of U.S. application Ser. No. 10/259,695, filed on Sep. 30, 2002, the specification of which is incorporated herein in its entirety.

The present invention relates to a spring device and more particularly to a spring device of the type used in automatic transmissions for motor vehicles.

INCORPORATION BY REFERENCE

Automatic transmissions for vehicles often include a plurality of coil springs that are adapted to apply a biasing force against clutch plates that control the engagement of various gears in the transmission. These coil springs are assembled in a ring shaped device comprising two annular plates having a multiplicity of circumferentially spaced, parallel compression coil springs mounted therebetween. Such a ring shaped spring device is disclosed in Orlowski U.S. Pat. No. 5,306,086, which is incorporated by reference herein as the basic background to which the present invention is directed. A ring shaped spring device is also disclosed in pending application Ser. No. 10/078,465 filed on Feb. 2, 2002 which is incorporated by reference herein as the basic background to which the present invention is directed.

BACKGROUND OF INVENTION

In the ring shaped spring device disclosed in Orlowski, there is a pair of spaced apart first and second annular support plates defining the ring shape of the spring device. A plurality of circumferentially spaced parallely oriented coil springs are disposed between the annular plates so that vertical movement of one plate toward the other compresses the springs. To interconnect the plates, an integral hook is formed in one plate and a loop is integrally formed in the other plate. The hook and loop are designed so that the device can be assembled by merely locating the various coil springs and then pressing one plate toward the other. The hook snaps over the loop to lock the plates together, with the coil springs partially compressed. However, when assembled in a transmission, the ring shaped spring device is compressed further so that the hook actually disengages the loop. Consequently, during repetitive operation of the spring assembly over many years, the individual coil springs can become canted in a manner to reduce the spring constant and cause damage and/or unintended biasing forces. By compressing the spring device for shifting the gears of the automatic transmission, distortion of the coil springs in the annular direction is magnified. Consequently, the prior ring shaped spring device, as shown in Orlowski only employs the concept of integral interconnecting elements and does not address the problem of controlling the annular movement of the spaced plates during long term operation of the spring device. Orlowski also must remove four of his coil springs to provide space for integral hooks used to maintain the plates relative to one another. As a result, the force produced by the Orlowski spring device is not maximized and is not balanced. The spring assembly in copending application Ser. No. 10/078,465 is a different mechanism to overcome the deficiency of Orlowski regarding circumferential shifting. But, this design uses spaces which should accept coil springs.

THE INVENTION

The present invention relates to a ring-shaped spring device as shown in Orlowski wherein there are a plurality of locking assemblies located at circumferentially spaced positions around the ring that are each within one of the coil spring's center passage. In this respect each of these lock assemblies includes a first element extending from one of the plates toward the other plate, a second element extending in the opposite direction from the other plate to form a generally sliding contact between the first and second elements as the spaced plates move vertically to compress and release the coil springs. The first and second elements are sized and shaped to fit within the center passage of the coil spring. This configuration maximizes the force produced by the ring shaped spring device and balances the circumferentially extending spring action.

In accordance with another aspect of the present invention, the first and second elements or tabs include a guiding mechanism to restrict annular movement at the plates relative to one another. The first tab having a guide slot with a given width and which extends in a direction perpendicular to the plates. The second tab having a hook shaped guide member which extends through the guide slot to restrict the vertical movement between the two plates. The width of the hook corresponds with the width of the slot which provides the guiding mechanism between the two plates. The structure assembly procedure and operation of the present invention is different than the ring shaped spring device in Orlowski. These added features further result in the advantage of being capable of maintaining the proper annular orientation between the spaced plates during long term operation of the spring device in an automatic transmission.

Still another aspect of the present invention, the guide slot has an end remote from the plate from which the second tab extends. The distance of this end from the plate maintains the coil springs in a compressed or prestressed condition when the device is assembled.

Yet another aspect of the present invention, by providing a tab which is sized to fit within the center passage of a coil spring, one of the annular support plates can be omitted. In its place are disk shaped pressure plates for each coil spring which reduces weight. Each of the disk plates includes a locking tab surface that maintains the disk plate and spring relative to the remaining annular plate.

Even yet another aspect of the present invention, there are an even number of locking assemblies around the circumference of the annular plates. One group of locking assemblies has the first tab extending from the first plate and the second group has the first tab extending from the second plate. By using two groups of locking assemblies, the tabs of a plate alternate between a tab with the guide slot and a tab with the hook. The tabs may be integrally formed in the guide plates as in Orlowski. In the one embodiment, four locking assemblies are used wherein the integral tabs at the twelve o'clock position and six o'clock position have one construction and the tabs at the three o'clock position and nine o'clock position have the opposite configuration. By merely indexing the plates 90°, identical plates can be used in constructing the ring shaped spring device.

Yet a further aspect of the present invention relates to utilizing molded tab components which incorporate one-way barbs or locking tabs to maintain the plates relative to one another. In this respect, one of the annular plates includes a plurality of spaced receptacles corresponding to the position of the coil springs. The receptacles are sized so that the coil springs fit about the receptacle. The other annular ring includes posts which also correspond to the position and number of coil springs. The receptacle is shaped to receive the post and includes one-way or locking barbs such that once the post enters the receptacle, it can not be removed.

Another aspect of the present invention involves spring tabs to locate the coil springs around the annular plates. These spring tabs are lanced from the edge of the annular plates and are bent downwardly at circumferentially spaced locations around the plates. The tabs are bent downwardly from a point generally at the midpoint of the plates, whereby the coil springs are located by the tabs in or near the center of the annular plates. This configuration allows the spring tabs to be produced by a simple punch press operation that first lances and then bends the tabs relative to the plate. This operation is much simpler than the complex bending operation required in Orlowski.

An object of the present invention is the provision of an improved ring-shaped spring device having two annular plates used to capture and locate circumferentially spaced coil springs, wherein the spring device guides the movement of the annular plates as the springs are compressed and/or released and solving the deficiencies of Orlowski U.S. Pat. No. 5,306,086.

Another object of the present invention is the provision of a spring device which utilizes locking assemblies that fit within the center passage of one of the coil springs so as to maximize the number of springs that can be utilized and balancing the spring action around the assembly.

Yet a further object of the present invention is the provision of a ring-shaped spring device wherein spaced annular plates are held together by lock assemblies having members that limit the movement between the plates to a generally vertical sliding movement as the plates move vertically to compress and/or release the coil springs, so the plates are fixed in a circumferential direction.

Even yet a further object of the present invention is the provision of replacing one annular ring with independent disk shaped pressure plates corresponding to each coil spring.

Another aspect of the present invention is the provision of utilizing molded components having one-way or locking barbs that can be easily snap-fitted together.

Even yet another object of the present invention is the provision of eliminating one annular ring by utilizing coil spring which can interengage with the other annular ring.

These and other objects and advantages will become apparent from the following description taken together with the accompanying drawings.

BRIEF DESCRIPTION OF DRAWINGS

FIG. 4 is an enlarged exploded partial view of the spring device shown in FIG. 1;

FIG. 5 is an enlarged cross-sectional view of another embodiment of a ring shaped spring device according to the present invention;

FIG. 6 is a cross-sectional view taken generally along line 6—6 of FIG. 5;

FIG. 14 is an enlarged cross-sectional view taken generally along line 14—14 of FIG. 11;

FIG. 15 is an enlarged cross-sectional view taken generally along line 15—15 of FIG. 11;

FIG. 16 is an enlarged exploded partial perspective view of the spring device shown in FIG. 11;

FIG. 17 is a top plan view of even yet another embodiment of a spring shaped spring device according to the present invention;

FIG. 18 is an enlarge cross-sectional view taken generally along line 18—18 of FIG. 17;

DESCRIPTION OF PREFERRED EMBODIMENTS

Figure 1:
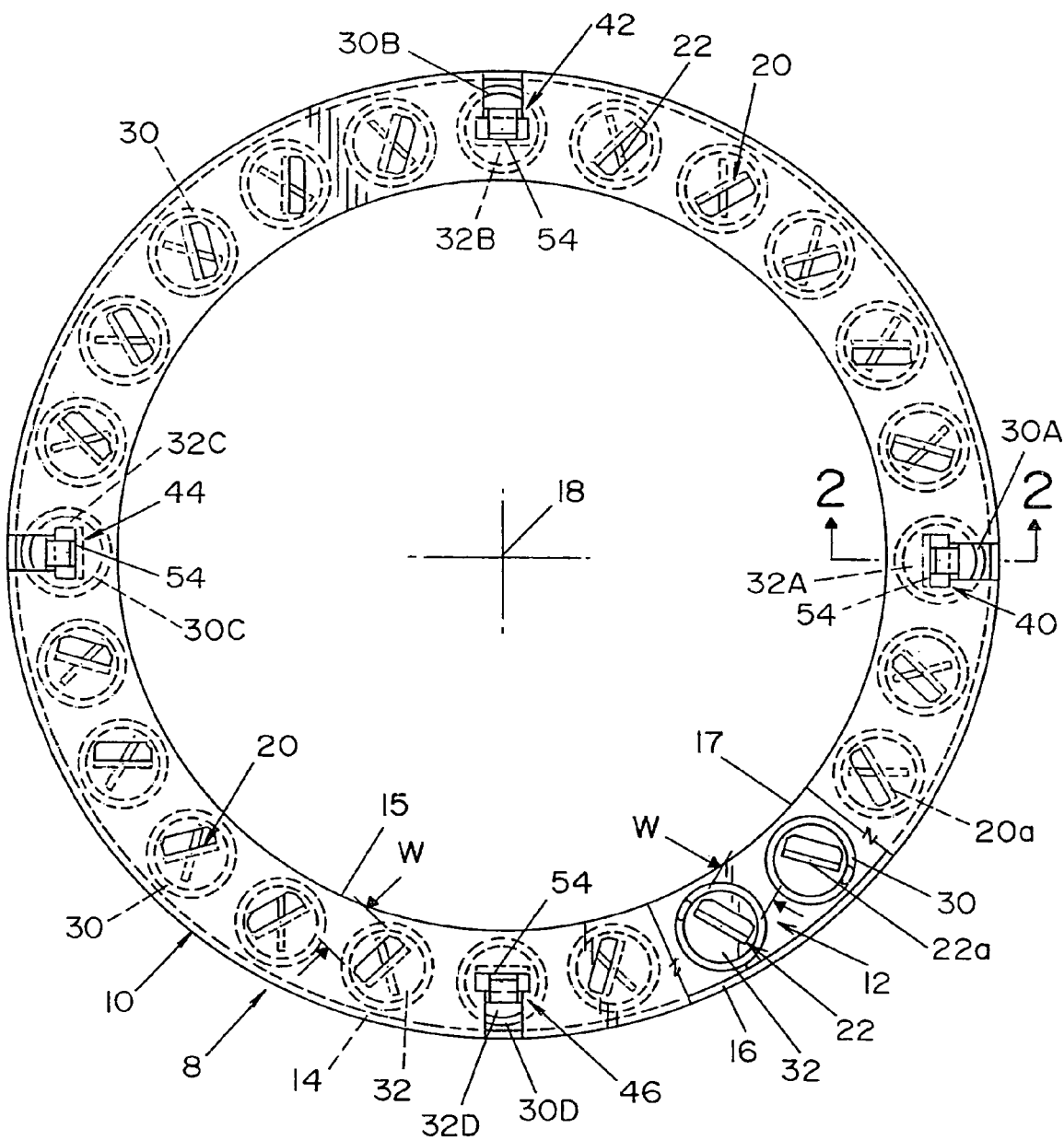
FIG. 1 is a top plan view of the ring shaped spring device constructed in accordance with an embodiment of the present invention.
Figure 3:
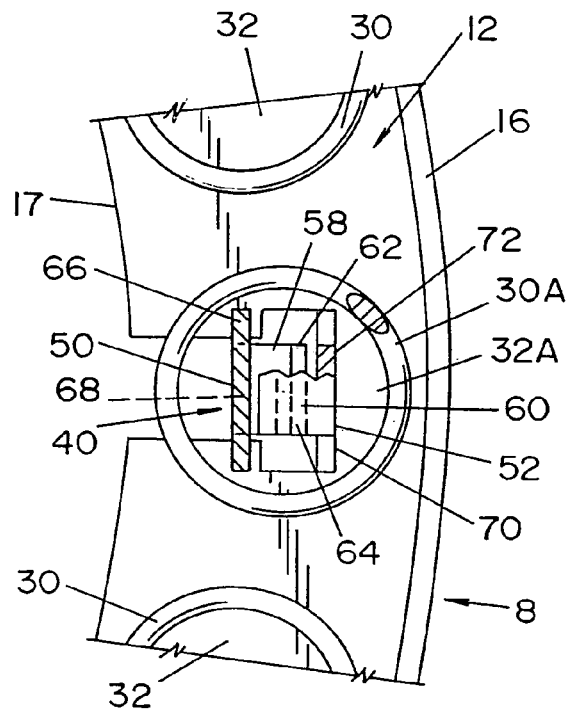
FIG. 3 is a cross-sectional view taken generally along line 3—3 of FIG. 2.

Referring now to the drawings, wherein the showings are for the purpose of illustrating preferred embodiments of the invention only and not for the purpose of limiting same, FIGS. 1, 2, 3 and 4 show a ring shaped spring device 8 having annular spaced-apart plates 10, 12 with outer rims 14, 16, respectively, and inner edges 15, 17. Plates 10, 12 are coaxial to axis 18 and include spring tabs 20 of plate 10 and spring tabs 22 of plate 12. The tabs, sometimes called "elements", are lanced from a center portion of its respective plate and are bent to locate at circumferentially spaced positions a number of coil springs 30. The spring tabs 20, 22 have spaced distal edges 20a, 22a facing one another and have a length such that there is a gap between edges 20a, 22a when device 8 as a whole is in a free state. Edges 20a, 22a engage one another to limit the vertical movement of plates 10, 12 toward one another. The widths W of the spring tabs are just slightly smaller than the diameters of passages 32 of springs 30. Any number of tabs and springs can be circumferentially spaced around plates 10, 12. In a preferred embodiment, twenty-four springs are employed and are equally spaced around plates 10, 12. The tabs or elements extend through the springs so there is no circumferential gap in the circular array of coil springs.

Four lock assemblies 40, 42, 44 and 46 are utilized to maintain plates 10, 12 relative to one another and are positioned within center passages 32A, 32B, 32C and 32D of coil springs 30A, 30B, 30C and 30D respectively. By positioning the lock assemblies within the coil springs, four additional coil springs can be utilized thereby increasing the possible overall spring force of spring device 8 without changing the design of coil springs 30. All lock assemblies 40, 42, 44 and 46 are essentially the same, however, the orientation of the assemblies is alternated one lock assembly to the next which allows plates 10, 12 to be identical. In this respect, while each lock assembly is structurally the same, lock assemblies 40, 44 are oriented in one direction and lock assemblies 42, 46 are oriented in the opposite direction. Plates 10, 12 are merely positioned facing each other and are rotated 90° relative to one another about axis 18 to properly align lock assemblies 40, 42, 44 and 46. The advantage of this concept is that by using identical plates, manufacturing and inventory costs can be reduced.

Since all lock assemblies 40, 42, 44 and 46 are structurally the same, only lock assembly 40 will be described in detail and this description applies to the other lock assemblies 42, 44 and 46. However, as stated above, assemblies 42, 46 are oriented differently. Lock assembly 40 includes hook tabs 50, 52 which are provided on the opposite plates 10, 12. Tabs 50, 52 are created by forming a lanced portion of plates 10, 12, respectively, wherein tabs 50, 52 are still attached to plates 10, 12, at bases edges 54, 56 respectively. Turning to tab 50, it is lanced from an outer portion of plate 10 such that there is a gap in plate 10 from base edge 54 which extends radially outwardly to rim 14. Tab 50 is bent at base edge 54 at a 90 degree angle from plate 10 toward plate 12 and includes a base portion 66, an extension 68 and a distal end 58. Tab 50 further includes a hook 62 on distal end 58 which is opened toward outer rim 14. Tab 52 is lanced from an inner portion of plate 12 such that there is a gap in ring 12 from base edge 56 which extends radially inwardly to edge 17. Tab 52 is bent at base edge 56 at a 90 degree angle from plate 12 towards plate 10 and includes base portion 70, an extension 72 and a distal end 60. Tab 52 further includes a hook 64 on distal end 60 which is opened toward inner edge 17. When plates 10, 12 are move vertically toward one another, hooks 62, 64 pass over each other and then prevent the plates 10, 12 from being separated vertically. As a result, plates 10, 12 can move vertically relative to one another, however, hooks 62, 64 prevent separation of the plates. The length of tabs 50, 52 determine the free-state height of device 8 as a whole and maintain the springs in a prestressed condition. In this respect coil springs 30 have a free-state spring height which is different than the overall free-state height of device 8. The free-state spring height is achieved when coil springs 30 are unstressed and allowed to extend to a maximum spring height (not shown). The gap between plates 10, 12 is less than the free-state height for coil springs 30 when hooks 62, 64 are interengaging with one another. Accordingly, springs 30 are exerting a force against plates 10, 12 even when the overall spring device 8 is in its unstressed or free-state condition. When an external force is applied to spring device 8, plates 10, 12 move vertically downwardly toward one another and hooks 62, 64 disengage. As discussed above, the downward vertical motion is limited by edges 20a, 22a of spring tabs 20, 22 respectively.

In the following discussions concerning other embodiments, the components of the spring device which remain the same, as discussed above, will include the same reference numbers as above.

Figure 2:
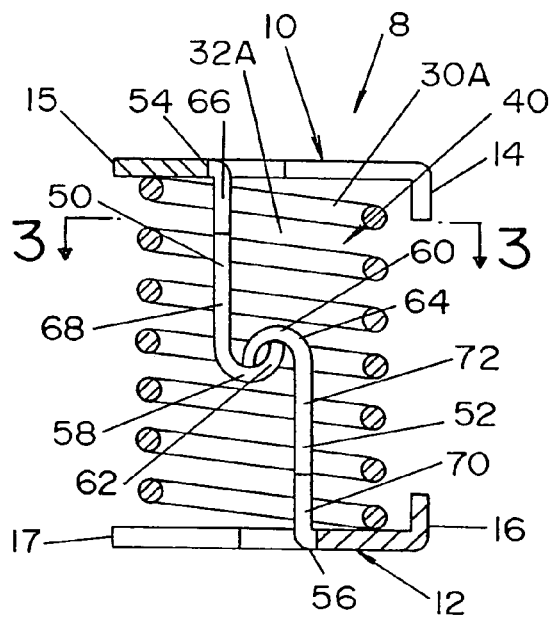
FIG. 2 is an enlarged cross-sectional view taken generally along line 2—2 of FIG. 1.
Figure 2A:
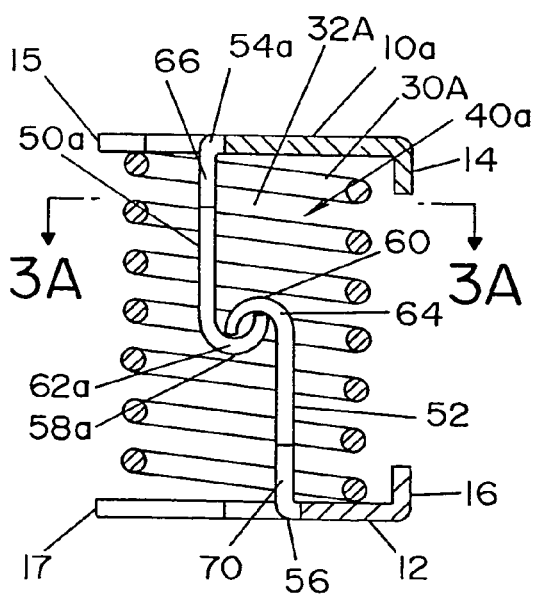
FIG. 2A is an enlarged cross-sectional view similar to FIG. 2 showing the top hook tab formed from material near the inner rim of top annular ring.
Figure 3A:
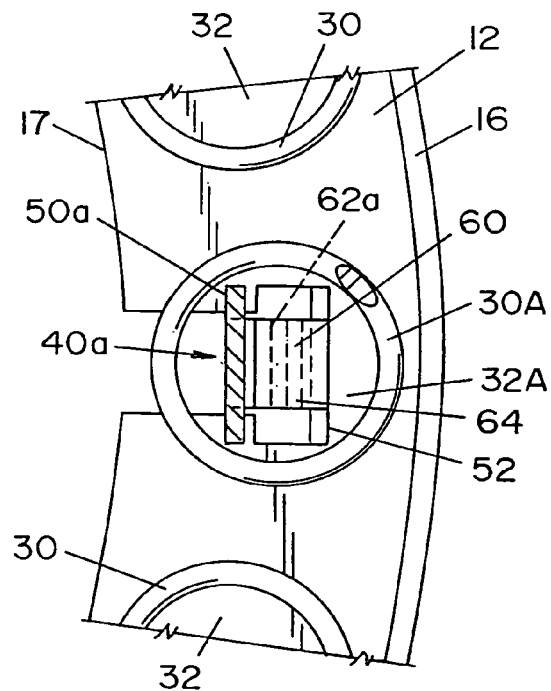
FIG. 3A is a cross-sectional view taken generally along line 3A—3A of FIG. 2A.
Figure 7:
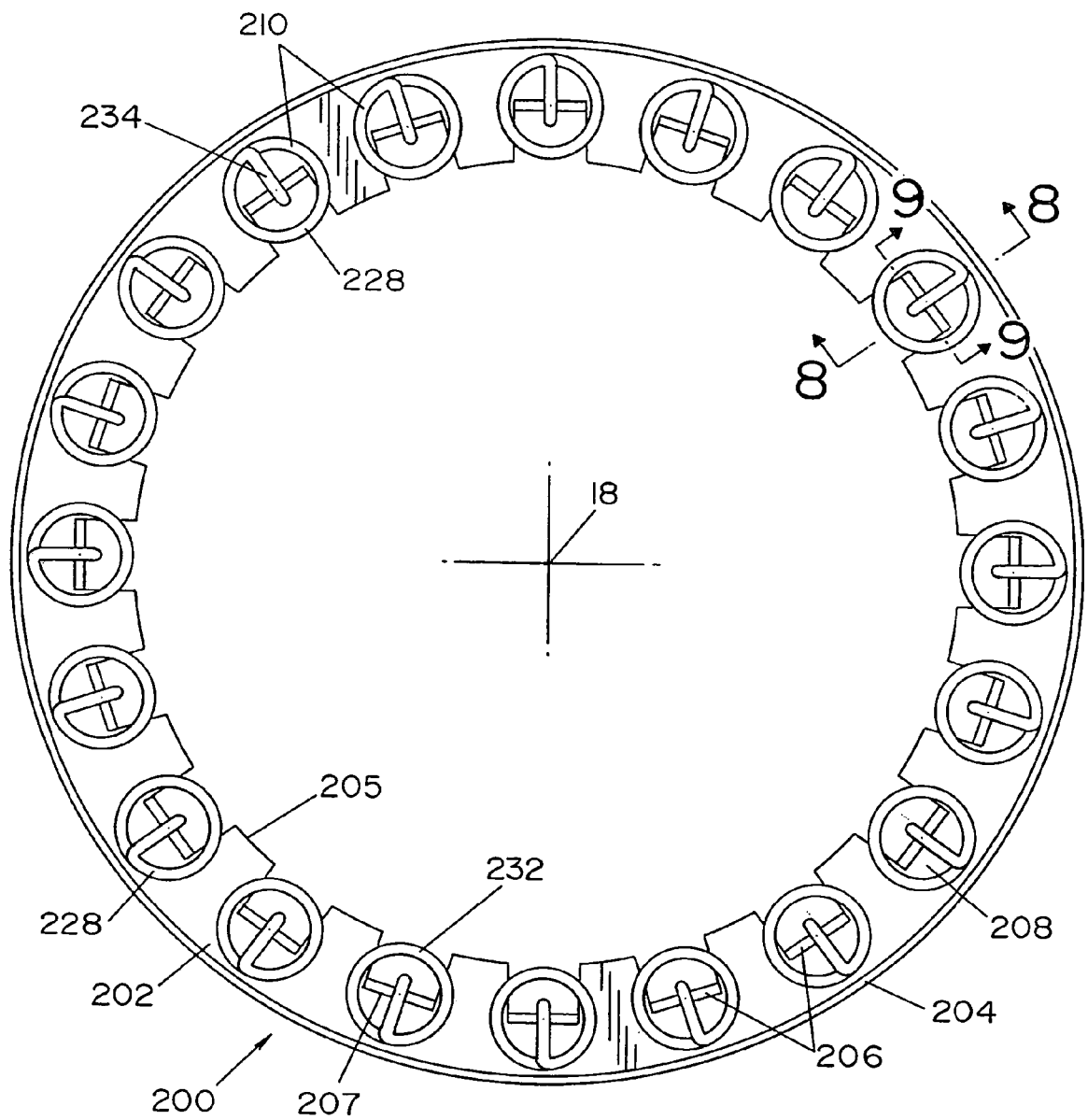
FIG. 7 is a top plan view showing another embodiment of a ring shaped spring device according to the present invention.
Figure 8:
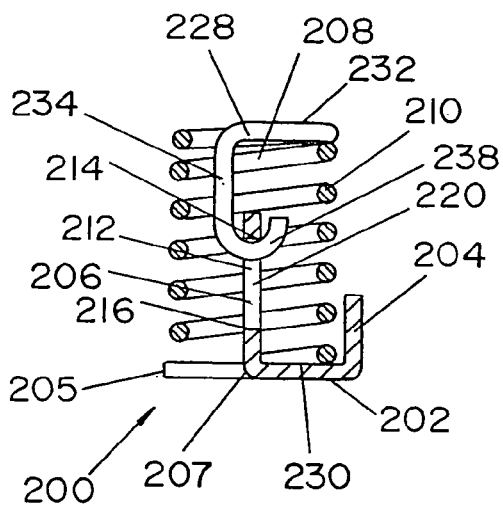
FIG. 8 is an enlarged cross-sectional view taken generally along line 8—8 of FIG. 7.
Figure 9:
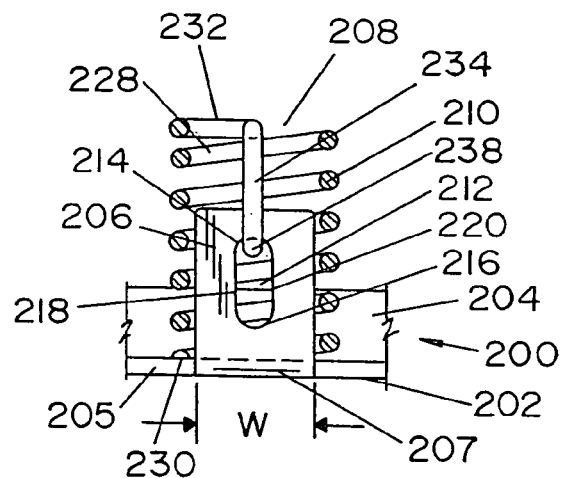
FIG. 9 is an enlarged cross-sectional view taken generally along line 9—9 of FIG. 7.
Figure 10:
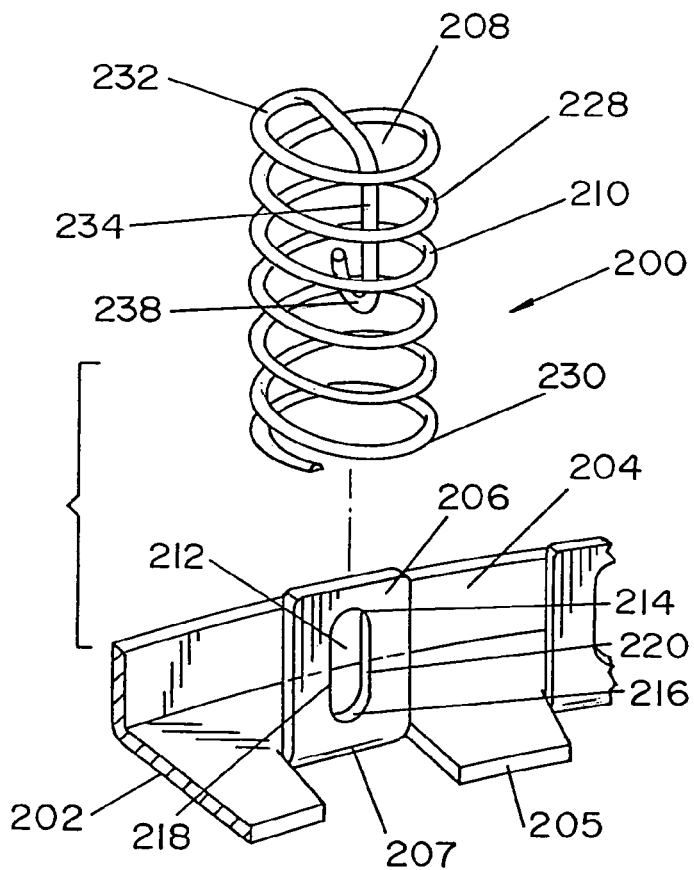
FIG. 10 is an enlarged exploded partial perspective view of the ring-shaped device shown in FIG. 7.
Figure 11:
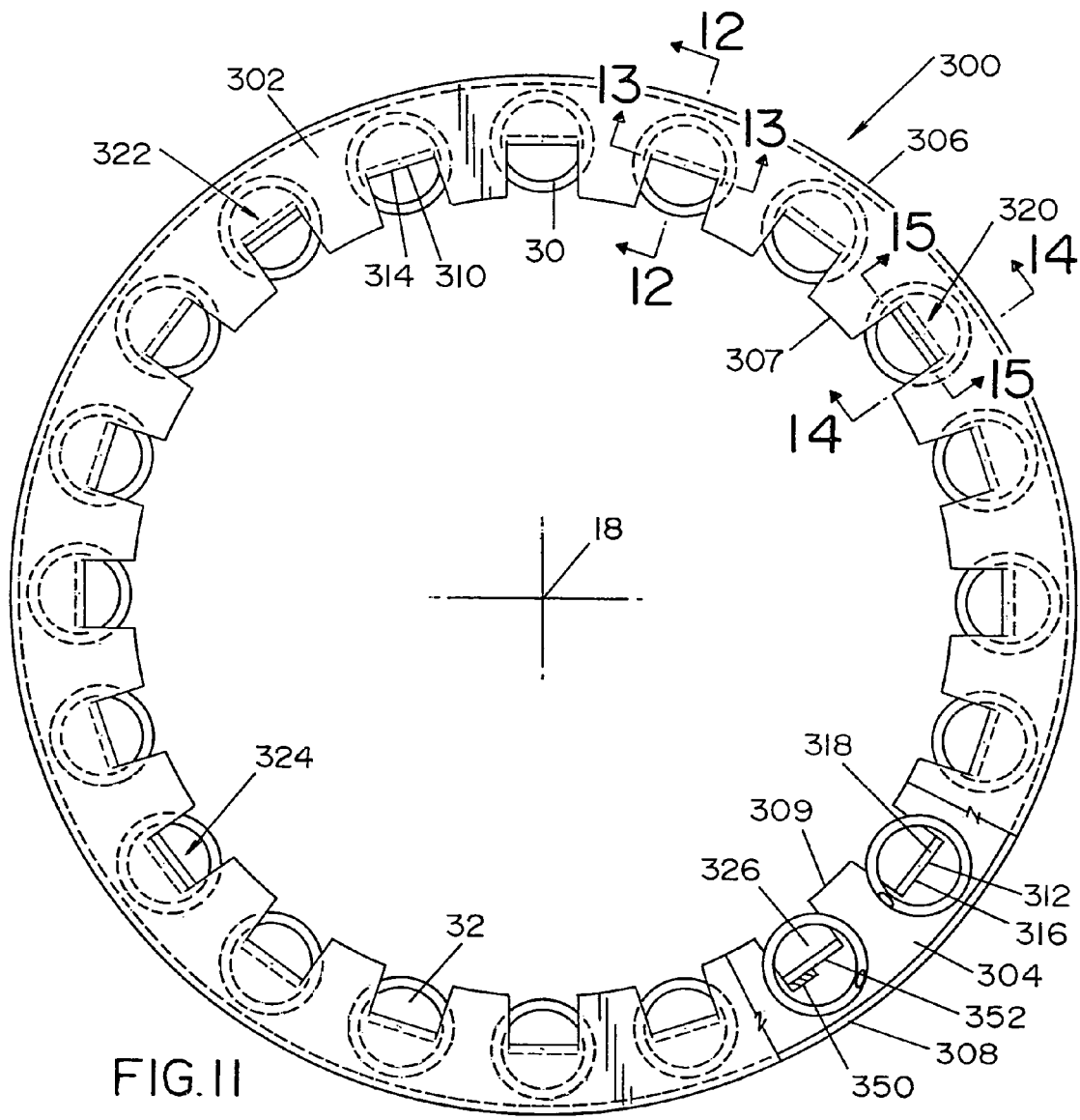
FIG. 11 is a top plan view of yet another embodiment of a ring shaped spring device according to the present invention.
Figure 12:
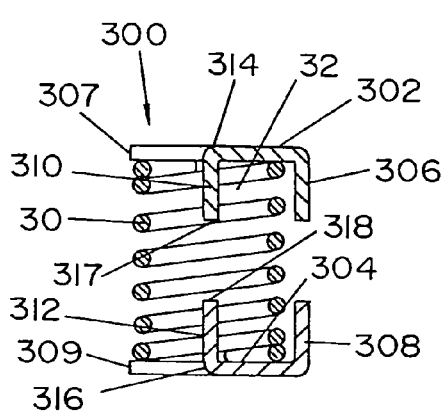
FIG. 12 is an enlarged cross-sectional view taken generally along line 12—12 of FIG. 11.
Figure 13:
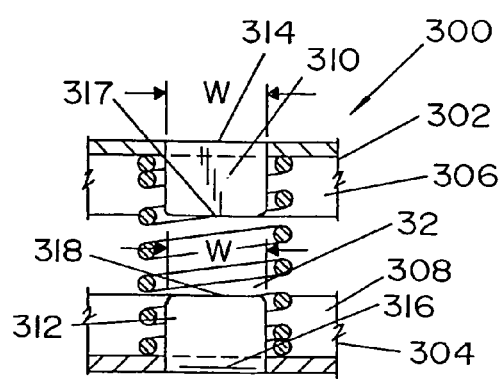
FIG. 13 is an enlarged cross-sectional view taken generally along line 13—13 of FIG. 11.
Figure 19:
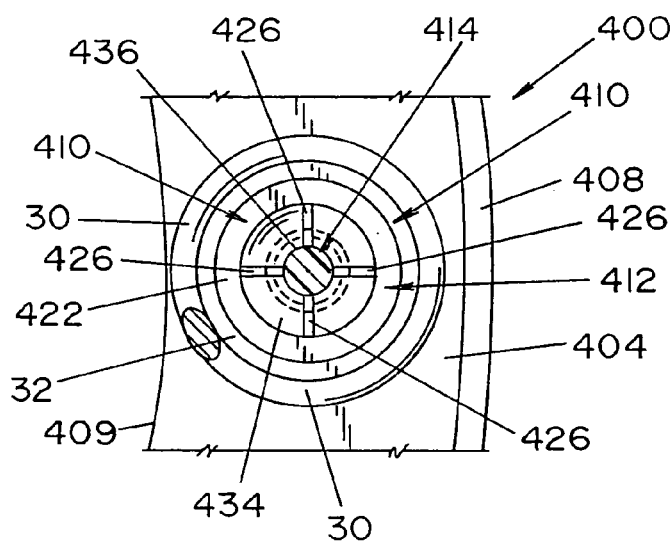
FIG. 19 is a cross-sectional view taken generally along line 19—19 of FIG. 18.
Figure 20:
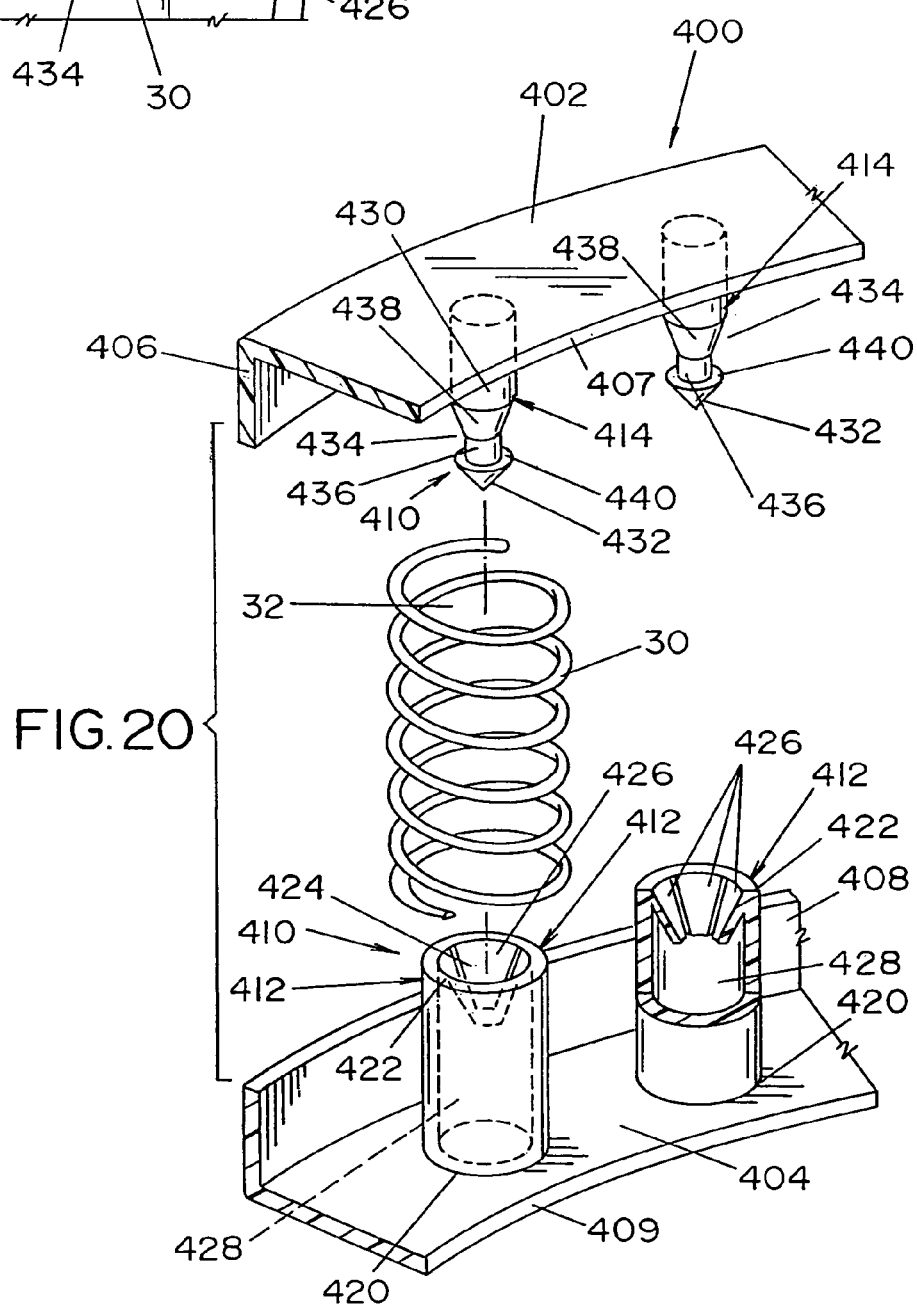
FIG. 20 is an exploded partial perspective view of the spring device shown in FIG. 17.

Referring to FIGS. 2A and 3A, Lock assembly 40a is shown which works the same way as lock assembly 40 except it includes hook tabs 52 and 50a. While tab 52 is the same as described above, tab 50a is lanced from an inner portion of plate 10a such that there is a gap in ring 10a from base edge 54a which extends radially inwardly to edge 15. Tab 50a is bent at base at a 90 degree angle from plate 10a toward plate 12. Tab 50a is bent at base edge 54a and includes a distal end 58a with a hook 62a which is opened toward outer rim 14 just like hook 62. The only difference being that tab 50a is formed from an inner portion of plate 10a while tab 50 is formed from the outer portion. In similar fashion as assembly 40, when plates 10a, 12 are move vertically toward one another, hooks 62a, 64 pass over each other and then prevent the plates 10a, 12 from being separated vertically.

Referring to FIGS. 5 and 6, a ring shaped spring device 100 is shown which is essentially the same as device 8 above except for a modification to the locking assemblies. More particularly, spring device 100 includes annular spaced-apart plates 10, 102 with outer rims 14, 104, respectively. Plates 10, 102 are coaxial to axis 18 and include spring tabs 20 (not shown) of plate 10 and spring tabs 22 (not shown) of plate 102 which are configured the same as above and therefore will not be discussed in detail. Any number of tabs and springs can be circumferentially spaced around plates 10, 102. In a preferred embodiment, twenty-four springs are employed and are equally spaced around plates 10, 102.

Four lock assemblies 110, 112, 114 and 116 (only 110 is shown) are utilized to maintain plates 10, 102 relative to one another. As with device 8, assemblies 110, 112, 114 and 116 are structurally the same except that they are oriented differently to allow plates 10, 102 to be identical. Therefore only assembly 110 will be described in detail and this description applies to the other lock assemblies 112, 114 and 116. Assembly 110 is positioned within center passage 32A of coil spring 30A and includes hook tab 50, described above, and slot tab 122. Slot tab 122 is formed from an inner portion of plate 102 and extends from a base edge 124 to a distal end 126. Tab 122 extends at a 90° angle from plate 102 toward plate 10 and has a maximum width 128 allowing it to fit within center passage 32A. Extending vertically in tab 122 is an elongated slot 130 having a width 132, a length 134 and a slot edge 136 near distal end 126. Side edges 138, 140 are essentially parallel to one another and extend from either side of slot edge 136 toward plate 102. Tab hook 62 along with extension 68 have essentially a common width which is slightly smaller than slot width 132 such that hook 62 can extend through slot 130. Accordingly, when plates 10, 102 are assembled, hook 62 first engages slot tab 122 and then enters slot 130. Once in slot 130, the engagement between hook 62 and slot edge 136 prevents separation of plates 10, 102. In addition, the length of tab 50 and slot 130 determine the free-state height of device 100 as a whole and maintains springs 30 in a prestressed condition. Movement of plates 10 and 102 relative to one another about axis 18 is controlled by the engagement between hook 62 and slot edges 138, 140. In this respect, hook 62 has hook edges 142, 144 and rotation is prevented in one direction by the engagement between slot edge 138 and hook edge 142 and in the other direction by the engagement between hook edge 144 and slot edge 140.

Referring now to FIGS. 7–10, a ring shaped spring device 200 is shown which includes only one annular plate 202. Plate 202 includes an outer rim 204 and an inner edge 205. Plate 202 further includes spring tabs 206 which are lanced from an inner portion of plate 202 wherein tabs 206 are still attached to plate 202 at base edges 207. In this respect, tabs 206 are formed by an inner portion of plate 202 such that there is a gap in plate 202 from base edge 207 which extends radially inwardly to edge 205. Tabs 206 are bent at a 90 degree angle at base edge 207 from plate 202. The widths W of the spring tabs are smaller than the diameters of the passages 208 of springs 210. Any number of tabs and springs can be circumferentially spaced around plate 202. In a preferred embodiment, twenty-four springs are employed and they are equally spaced around plate 202.

Each spring tab 206 includes a vertically extending slot 212 having a top edge 214, a bottom edge 216 and parallel side edges 218 and 220. Each spring 210, is made from a single wire 228 and includes a bottom edge 230 which rests on plate 202 and a top edge 232 spaced from bottom edge 230. Spring 210 further includes extension 234 which is a continuation of wire 228 and which extends downwardly into center passage 208. At the end of extension 234 is a hook 238 shaped and sized to enter slot 212. Spring 210 is assembled to plate 202 by urging spring 210 over tab 206 and partially compressing spring 210 until hook 238 enters slot 212. Once hook 238 enters slot 212 it maintains spring 210 relative to plate 202 in a prestressed condition with spring bottom 230 engaging plate 202. As spring 210 is compressed by the transmission, hook 238 rides in slot 212 between top and bottom edges 214, 216 respectively.

Referring now to FIGS. 11–16, yet even another embodiment is shown. Shown is a ring shaped spring device 300 having annular spaced apart plates 302, 304 with outer rims 306, 308, and inner edges 307, 309, respectively. Device 300 includes spring tabs 310 for plate 302 and spring tabs 312 for plate 304 which are each lanced from an inner portion of plates 302, 304, respectively, wherein tabs 310 are attached to plate 302 at bases edges 314 and tabs 312 are attached to plate 304 at base edges 316. In this respect, tabs 310 are formed from an inner portion of the plates between base edges 314, 316 and inner edges 307, 309 respectively. Tabs 310, 312 are bent at a 90 degree angle at base edges 314, 316. The widths W of the spring tabs are smaller than the diameters of passages 32 of springs 30. Any number of tabs and springs can be circumferentially spaced around plates 302, 304. In a preferred embodiment, twenty-four springs are employed and are equally spaced around plates 302, 304. Spring tabs 310, 312 have spaced distal edges 317, 318 facing one another and have a length such that there is a gap between edges 317 and 318 when device 300 as a whole is in a free state. Edges 317, 318 engage one another to limit the vertical movement of plates 302, 304 toward one another.

Four lock assemblies 320, 322, 324 and 326 are positioned about plates 302, 304. While four such assemblies are shown, as with the other embodiments, a different number of assemblies could be utilized. As with previous embodiments, assemblies 320, 322, 324 and 326 are structurally the same except that they could be oriented differently to allow plates 302, 304 to be identical. Therefore only assembly 320 will be described in detail and this description applies to the other lock assemblies 322, 324 and 326. Referring with particular reference to FIGS. 14, 15 and 16, lock assembly 320 includes a hook tab 350 and a notch tab 352. Tabs 350, 352 are created by forming a lanced portion of plates 302, 304, respectively, wherein tabes 350, 352 are still attached to plates 302, 304 at bases edges 354, 356 respectively. Turning to tab 350, it is lanced from an inner portion of plate 302 such that there is a gap in plate 302 from base edge 354 to inner edge 307. Tab 350 is bent at base edge 354 ninety degrees from plate 302 toward plate 304 and includes a base portion 358, an extension 360 and a distal end 362. Extension 360 has a width which is approximately half the width of base portion 358 and further, extension 360 extends from one side of base portion 358 thereby making hook tab 350 L-shaped. Tab 350 further includes a hook 364 on distal end 362 which is opened toward inner edge 307. Tab 352 is lanced from an inner portion of plate 304 such that there is a gap in ring 304 from base edge 356 to edge 309. Tab 352 is bent at base edge 356 ninety degrees from plate 304 toward plate 302 and is essentially C-shaped having outer side edges 366, 368 which extend from plate 304 towards distal end 370 of tab 352. Side edge 368 includes a notch 372 having parallel notch edges 374, 376 that are joined by vertical notch edge 378. The length of notch edges 374, 376 corresponds with the width of hook 364. With particular reference to FIG. 15, by utilizing L-shaped hook tab 350 and C-shaped notch tab 352, assembly 320 can fit within spring cavity 32 and can be assembled without forcing hook 364 to deform in order to pass over its engagement point on notch tab 352. In this respect, while within cavity 32, hook 364 can be manipulated to pass next to edge 368 and then to be positioned within notch 372. As hook 364 is being manipulated into notch 372, spring 30 is partially compressed. Once in notch 372, spring 30 forces plates 302 and 304 away from one another until hook 364 engages edge 374.

Referring now to FIGS. 17–20, a ring shaped spring device 400 is shown which includes annular spaced apart plates 402, 404 with outer rims 406, 408 and inner edges 407, 409, respectively. Spring device 400 is shown to include twenty-four lock assemblies 410, however, it should be noted that less than twenty-four lock assemblies could be used and less than twenty-four coil springs 30 could be used. However, it is preferred that all twenty-four springs 30 are used in connection with twenty-four lock assemblies 410. Lock assemblies 410 are all identical and each includes a receptacle 412 and a post 414. Receptacle 412 is cylindrical with a base end 420 secured to plate 404 and which extends toward plate 402. Receptacle 412 has a distal end 422 spaced from end 420 that includes an opening 424 to an inner portion 428. Receptacle 412 further includes several barbs 426 that extend downwardly into inner portion 428. Post 414 includes a base 430 connected to plate 402 and extends toward plate 404. In addition, post 414 includes a tapered lead 432 which is shaped to urge barbs 426 outwardly and allow a portion of post 414 to enter inner portion 428. Post 414 further include locking groove 434 having a cylindrical portion 436 and a frustum conical portion 438 adjacent to cylindrical portion 436. As a result, once tapered lead 432 urges barbs 426 outwardly and allows the end of post 414 to enter inner portion 428, barbs 426 spring into locking groove 434 thereby retaining post 414 relative to receptacle 412. Cylindrical portion 436 provides for the compression of spring 30 by allowing post 414 to move downwardly into inner portion 428. However, barbs 426 do not allow post 414 completely pull out of inner portion 428. Furthermore, the vertical dimensions of post 414 and receptacle 412 are such that when barbs 426 engage edge 440, springs 30 remain in a prestressed condition. In addition, the engagement between the post and the receptacle prevent rotational movement of plate 402 relative to plate 404 about axis 18.

Figure 21:
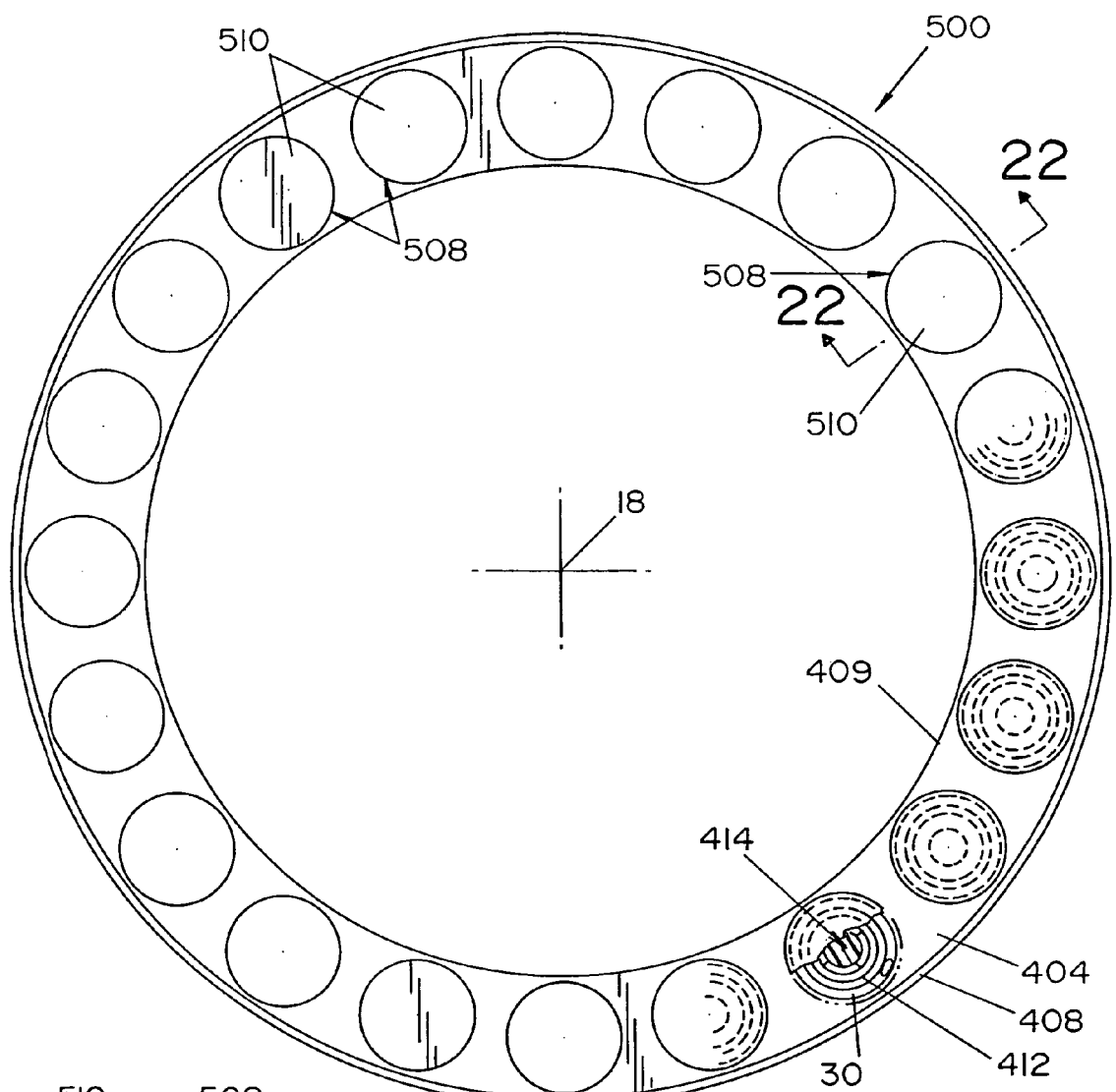
FIG. 21 is a top plan view of still yet a further embodiment of a ring shaped spring device according to the present invention.
Figure 22:
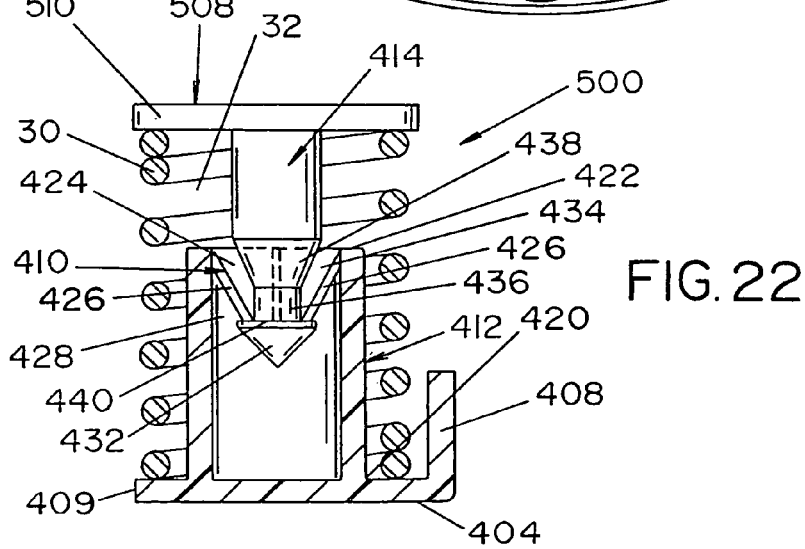
FIG. 22 is an enlarged cross-sectional view taken generally along line 22—22 of FIG. 21; and, FIG. 23 is an exploded partial perspective view of the spring device shown in FIG. 21.
Figure 23:
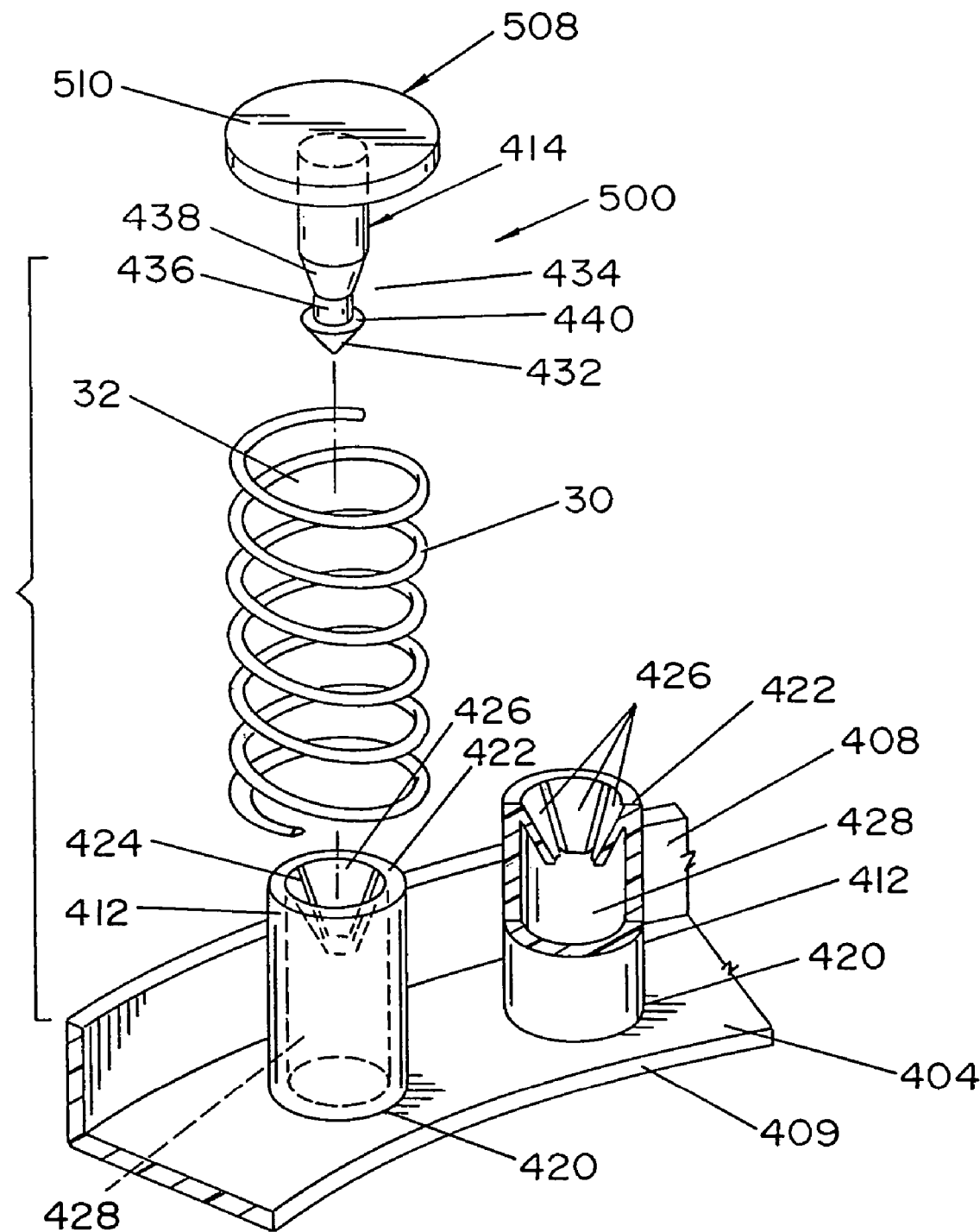

Referring to FIGS. 21–23, a ring shaped spring device 500 is shown which includes only a single annular plate 404 as described above. Spring device 500 further includes twenty-four receptacles 412 which are the same as described above with respect to spring device 400. However, device 500 includes twenty four independent post assemblies 508. While each post assembly 508 includes posts 414 as described above, each post assembly 508 is joined to a post disk 510 that has a diameter greater than the outer diameter of springs 30. This results in each post assembly 508 moving independent of one another. The functional relationship between post 414 of assemblies 508 and receptacle 412 is also the same as described above with respect to spring device 400 and therefore will not be described in detail.

While considerable emphasis has been placed on the preferred embodiments of the invention illustrated and described herein, it will be appreciated that other embodiments can be made and that many changes can be made in the preferred embodiments without departing from the principles of the invention. Accordingly, it is to be distinctly understood that the foregoing descriptive matter is to be interpreted merely as illustrative of the invention and not as a limitation.

Having thus defined the invention, it is claimed:

1. A spring device comprising an annular support plate defining a ring with a central ring axis; a plurality of circumferentially spaced, parallel oriented coil springs disposed on one side of said annular plate and having associated therewith a free-state height for said coil springs, each of said coil springs including a first end engaging said one side and a second end spaced from said one side, said each spring being formed by a unitary wire coiled about a spring axis between said first and second ends which defines a spring center passage, said each spring further including a wire extension formed by said unitary wire which extends from said second end into said center passage toward said first end, said extension having a spring hook; and, a plurality of tabs located at circumferentially spaced positions around said ring, each of said tabs extending from said plate into said center passage of a respective said each spring and has a guide slot extending in a direction perpendicular to said plate, said spring hook extending through said slot to maintain said each spring relative to said plate and to prevent said each spring from reaching said free-state height.

2. A spring assembly, as defined in claim 1, wherein said tabs are formed integrally of said plate from which they extend.

* * * * *